United States Patent [19]
Theron et al.

[11] 4,064,284
[45] Dec. 20, 1977

[54] PROCESS FOR THE DEBRANNING OF WHEAT

[75] Inventors: Pieter Paul Adriaan Theron, Cowie Hill; Adrianus Martinus Vissers; Aureliano Luigi Saisselin, both of Durban, all of South Africa

[73] Assignee: CPC International Inc., Englewood Cliffs, N.J.

[21] Appl. No.: 598,103

[22] Filed: July 22, 1975

[51] Int. Cl.² .................................................. A23L 1/00
[52] U.S. Cl. ...................................... 426/626; 426/482
[58] Field of Search ............... 426/482, 618, 626, 619, 426/483, 430, 436

[56] References Cited
U.S. PATENT DOCUMENTS

| 3,264,113 | 8/1966 | Barta et al. | 426/482 |
| 3,851,085 | 11/1974 | Rodgers et al. | 426/626 |

Primary Examiner—Raymond N. Jones

[57] ABSTRACT

A process is disclosed for debranning wheat and the debranned wheat product obtained therefrom. The process for obtaining the debranned wheat product comprises mixing wheat with an acid medium containing sulphuric acid at a concentration of at least about 80% by weight, the amount of acid medium and wheat being present so as to provide an acid medium: wheat ratio no greater than about 30% by weight. The wheat is permitted to remain in contact with the acid medium for a period sufficient to recover therefrom a debranned wheat product wherein the wheat loss is no greater than about 40% by weight.

34 Claims, No Drawings

PROCESS FOR THE DEBRANNING OF WHEAT

This invention relates to a method of treating wheat and a wheat food product obtained therefrom.

BACKGROUND OF THE INVENTION

Wheat has long been generally used in connection with preparing and cooking foods. However, the use of wheat as a food in and of itself has not been fully accepted. Some of the reasons for this non-acceptance are the long cooking time which raw wheat requires, the leathery feel of cooked wheat in the mouth, and its pronounced bran-like flavor. These undesirable properties are primarily attributed to the bran portion of the wheat.

Various attempts have been made to remove the bran from wheat such as using prolonged soaking and cooking periods, followed by drying, then partial debranning in abrasive mills, and finally debranning in Burr mills. Other attempts include partial debranning by scouring the wheat kernels, partial debranning by abrasion of the damp wheat kernels, prolonged soaking followed by pressure cooking and drying.

In general, these approaches have not been generally effective or acceptable as the end products exhibited only slight improvement over raw wheat, the methods used required prolonged treatment periods and could only be carried out on small batches, and the mouth feel of the end product was unacceptable.

Additional approaches employing bulgur wheat required soaking, precooking and treating the wheat with caustic soda solutions. In some of these processes, a 25% caustic soda solution was used, while in others a lower concentration was used since it was believed that the caustic soda concentration affected the taste of the end product. However, it was found that this hot treatment with caustic soda generally affected the taste and also tended to affect the color of the end product thereby also necessitating a bleaching process.

THE INVENTION

A method of removing bran from wheat has now been found that includes the steps of mixing wheat kernels with a mineral acid medium having a mineral acid concentration of at least about 80% by weight; and, maintaining the wheat kernels in contact with the acid medium for a period of time sufficient to effect a wheat loss of less than 40% by weight.

Any suitable mixing apparatus such as a reactor vessel equipped with stirring blades which extend across the inner diameter of the vessel can be used to mix the wheat with the concentrated acid medium and mixing or agitating the wheat while it is in contact with the acid medium can be continued for either part of the contacting period or during substantially the entire period. In general, the longer the contact period, the greater the tendency for the acid medium to react with the wheat kernels which can result in an undesirable blackening of the seams of the kernels and damage to the kernels. In addition, the longer the contact period, the greater will be the level of salt residue imparted from the acid medium onto the wheat which can result in an organoleptically unacceptable product, particularly from the palatability point of view.

Mixing or agitating the wheat while it is in contact with the acid medium is one factor that affects the duration of treatment. Generally, the lower the concentration of the acid medium, the greater will be the need for mixing or agitation.

Abrasion of the wheat grains during mixing facilitates separation of the bran from the wheat. The greater the mass of wheat being treated, the greater will be the friction created which, in turn, increases the degree of abrasion resulting in speeding the rate of bran removal.

The duration of treatment can be controlled to provide a balance between the proportion of wheat debranned and the proportion of wheat loss such as a wheat loss of less than about 25% to 30% by weight, preferably less than about 20% by weight.

By increasing the concentration of the acid medium, the contact period required can be reduced resulting in obtaining debranned wheat kernels having a better appearance and decreased cooking time of the debranned wheat. Thus, an acid concentration of generally less than about 75% by weight is not desirable as at this concentration, the acid medium tends to penetrate and thereby damage the wheat kernels. On the other hand, acid mediums having a concentration above about 80% by weight will not detrimentally penetrate the wheat kernels. Furthermore, at acid medium concentrations greater than about 80% by weight, the period required for debranning the wheat and cooking the debranned product becomes more commercially attractive.

The mineral acid used as the acid medium is sulphuric acid, preferably at a concentration of at least about 90% by weight and optimumly at a concentration of at least 95% by weight. While the acid medium can consist entirely of concentrated sulphuric acid, sulphuric acid in the form of sulphuric acid oleum can also be used with equal effectiveness. If desired, other mineral acids can be included in the acid medium such as hydrochloric acid, nitric acid, phosphoric acid, and the like as well as mixtures thereof. However, it has been found that the greater the proportion of such other mineral acids present in the acid medium, the longer will be the period required for debranning.

Any suitable quantity of acid medium can be used, but the proportion of acid medium to wheat should be as low as possible consistent with effective debranning of the wheat. Generally, the lower the proportion by weight of acid medium to wheat, the greater will be the abrasive effect between the wheat grains during mixing which will result in improved efficiency.

The proportion by weight of acid medium to wheat should be less than about 30%, preferably about 10% to 20% by weight and optimumly about 13% to 16% by weight. If the proportion by weight of acid medium to wheat is less than about 20% by weight, longer mixing times will generally be required. On the other hand, where the proportion by weight of acid medium to wheat is less than about 13% by weight, rapid mixing will usually be required.

Once treatment has been completed, the acid medium should be removed as rapidly as possible. For example, the acid medium can be readily removed from the wheat after treatment by water washing the wheat/acid mixture. Washing can be carried out by any suitable means such as by stirring water into the mixture and decanting the supernatant effluent and repeating the process until the acid medium has been removed as indicated by neutral pH. Alternatively, a plurality of high pressure jets can be used to spray a washing liquid onto the wheat/acid mixture as it is conveyed away from the treatment vessel. Preferably, removal of the acid medium is accomplished by washing the mixture in a conventional reactor vessel equipped with agitation means which also serve to remove remnants of bran adhering to the wheat by attrition between the kernels.

The wheat/acid medium mixture can also be washed by adding a washing liquid to the mixture such that the mixture is fluidized. The fluidized mixture can then be conveyed to a washing vessel equipped with agitation means where it can be washed as it is agitated. The washing vessel can conveniently be equipped with a washing liquid inlet, a washing liquid outlet protected by a kernel screen, and agitating blades of the type adapted to concurrently agitate and project the fluidized mixture upwardly. Typically, the washing liquid will have bran remnants entrained therein so that as the washing liquid flows through the outlet, the kernel screen will retain the wheat kernels in the washing vessel. The washing liquid can conveniently be water or an alkaline solution which can be recycled for further use.

Optionally, the wheat kernels can be neutralized after washing by neutralizing the acid medium and removing the neutralized solution which can then be removed by further washing accompanied by agitation to remove bran remnants. Neutralizing the acid medium can be effected by treating the wheat/acid medium mixture with an alkaline solution such as, for example, a sodium hydroxide solution, a sodium carbonate solution, a sodium bicarbonate solution, a calcium carbonate solution, a calcium hydroxide solution, or the like.

After treatment, washing and neutralizing, the debranned wheat kernels can be dried by any suitable means to a moisture content of about 10% to 12% by weight. Either before or after drying, the debranned kernels can be precooked to provide a par-cooked wheat product which results in faster cooking times for the consumer. Either during or after debranning, flavoring and coloring agents, and the like can be added to enhance the quality of the debranned wheat.

The method of the invention can be carried out at any suitable temperature such as at ambient temperature, but a slight increase in temperature will tend to reduce the treatment period.

In carrying out the method of the invention, the treatment period for a particular variety of wheat to be treated can be readily determined by treating a sample batch of the wheat variety with the acid medium, removing incremental samples at suitable intervals and visually inspecting the samples to determine the extent of debranning.

Accordingly, it was found that a variety of wheat reaped during a dry period was more suitable for treatment than the same variety that had been exposed to rain a short while before harvest. Thus, the moisture content of the wheat to be treated is another factor affecting the treatment period. For example, the moisture content of samples taken from a specific variety of wheat was adjusted by weight to 14%, 18%, 20%, 24%, and 28%, respectively. Tests conducted in accordance with the method of this invention on the different samples produced the results set forth in Table I below.

TABLE I

| % Moisture Content of Samples (by wgt.) | Treatment Period (Mins.) | Temperature of Mass (° C) (Acid Medium and Wheat Kernels) |
|---|---|---|
| 14 | 15 | 36 |
| 16 | 15 | 42 |
| 18 | 16 | 44 |
| 20 | 16 | 44 |
| 24 | 21 | 43 |

TABLE I-continued

| % Moisture Content of Samples (by wgt.) | Treatment Period (Mins.) | Temperature of Mass (° C) (Acid Medium and Wheat Kernels) |
|---|---|---|
| 28 | 25 | 43 |

As can be seen from the results above, the degree of efficiency of removal of bran generally decreases with increasing moisture content. After treatment, the samples were dried and subsequently boiled for 20 minutes whereupon it was found that all the samples were soft except those samples prepared from wheat having 24% and 28% moisture contents which were found to be tough and hard. While it appeared that the sample containing 24% moisture may have improved with further boiling, the sample made containing 28% moisture had so much residual bran that the bran flavor was noticeable and its tough leathery texture could not be entirely removed even with prolonged boiling. Preferably, therefore, the moisture content of the wheat to be treated should be reduced to less than about 20% by weight. This can be accomplished by passing the wheat through conventional drying ovens before treatment. This will result in shorter treatment periods, more effective debranning and a more palatable and organoleptically acceptable product.

While the acid medium should only be diluted by means of the moisture contained in the outer layers of the wheat grains, extra care should be exercised where the wheat has an unduly high initial moisture content as the method of the invention becomes less effective as the concentration of the acid medium decreases.

From the foregoing, it will be seen that the duration of the treatment period depends somewhat upon the concentration of acid medium, the degree of mixing (agitation) during treatment, the proportion of acid to wheat, the initial moisture content of the wheat, and the treatment temperature. Proper balancing of these factors in carrying out the method of the invention will result in attaining the most effective and economical course of treatment.

In addition, different varieties of wheat will require slightly different treatment periods and different cooking periods to obtain proper softening and optimize the organoleptic properties as well as the mouth feel of the treated wheat. These differences are illustrated from results obtained from additional tests in which 98% sulphuric acid was used as the acid medium at ambient temperatures. During treatment, the temperature increased to about 40° C. In all instances, complete debranning was accomplished with a wheat loss of about 15% by weight. The results of these tests are set forth in Table II below.

TABLE II

| Variety of Wheat | Treatment Period (min.) | Soft Cooking Time (min.) | Mouth Feel and Taste |
|---|---|---|---|
| White Zambezi | 12 | 20 | Slightly "bready" |
| Scheepers | 25 | 22 | Pasta-like |
| Red Zambezi | 22–25 | 20 | Smooth, pasta-like |
| OFS B1 | 13 | 20 | Smooth |
| Durum | 13 | 15 | Very Smooth, Pasta-like |
| Tokwe | 20 | 20 | Dull, course, bread-like |
| Betta | 16 | 20 | Fair |
| Bella | 16 | 20 | Fair |
| Inia | 18 | 20 | Smooth, pasta-like |

From the above results, it will be noted that although there was little difference in treatment periods and cooking times, significant differences in mouth feel and taste were obtained with different wheat varieties.

Based upon additional tests using a particular variety of wheat, it was found that the treatment period when using concentrated sulphuric acid or a concentrated sulphuric acid solution as the acid medium should generally be less than about 1 hour. The results of these tests are shown in Table III below and were obtained using two different wheat varieties identified as variety A and variety B, variety B having larger kernels than variety A. Wheat variety A was used in Runs 1–7 and wheat variety B was used in Run No. 8. Agitation was used in all tests except for Run No. 2.

TABLE III

| Run No. | Concentration of Acid Medium (% by wgt.) | Treatment Period Debranning | Treatment Period Total | Wheat Loss % | Sulphate Residue in Treated Wheat (ppm) |
|---|---|---|---|---|---|
| 1 | 98 | — | 1 hr. | 25 | 2100 |
| 2 | 98 | — | 1 hr. | 15 | 2000 |
| 3 | 98 | — | 2 hrs. | 30 | — |
| 4 | 75 | — | 3 hrs. | 35 | 3200 |
| 5 | S.G.:1.83 | 20 Mins. | 20 Mins. | — | <600 |
| 6 | 95 | 30 Mins. | 30 Mins. | — | <600 |
| 7 | 80 | 30 Mins. | 30 Mins. | — | <600 |
| 8 | 98 | 8–10 Mins. | 10 Mins. | — | <300 |

From the above results it will be seen that the longer the treatment period, the greater will be the wheat loss and the greater will be the level of salt residue thereby resulting in a less economical process and less acceptable product. Conversely, treatment periods of less than about 30 minutes resulted in effective debranning, reduced salt residues and minimal wheat loss resulting in an economical process and acceptable product.

The results in Table III above also show that when sulphuric acid having a 75% by weight concentration was used for a treatment period of 3 hours with agitation, a larger wheat loss and a high sulphate residue resulted. This illustrates that use of lower concentrations of sulphuric acid results in lower effectiveness and efficiency.

The effects of agitation are also apparent from the results shown in Table III. In particular, treatment with sulphuric acid having a concentration of 98% by weight for 1 hour without agitation resulted in a wheat loss of 15% (Run No. 2) whereas, under the same conditions but with agitation, the wheat loss was substantially higher (Run No. 1).

It was further found that if the sulphate residues exceed about 300 p.p.m., a product was obtained which was organoleptically inferior. In additional experiments using concentrated sulphuric acid (>95%) and treatment period of less than about 20 to 30 minutes, sulphate residues as low as about 200 to 300 p.p.m. were obtained resulting in a better tasting and more organoleptically acceptable product.

EXAMPLES

The invention is further illustrated by the following examples which are set forth as being exemplary and are not intended to be, nor should they be construed as being, limitative of the invention.

EXAMPLE 1

Two kg. of wheat were placed in a stainless steel bowl of a small epicyclic mixer to which 260 g. of concentrated sulphuric acid (S.G. 1.83) were added and the whole mixture then agitated at the slowest speed of the mixer. During this period, the wheat kernels took on a darkened appearance due to the sulphuric acid darkening upon dissolving the bran and there was also a rise in temperature in the mass. After 20 minutes, the mix was washed four times with clean water under agitation, following which the suspension in water was neutralized with ±5 g. of calcium hydroxide. The resulting slurry, under agitation, was washed several times more during which time the remainder of the bran fragments were removed. The clean kernels were then dried in a warm air drier to a moisture content of 12%. Upon cooking, these kernels became soft in 20 minutes, had a desirable mouth feel and a good appearance.

EXAMPLE 2

Two kg. of wheat were placed in a stainless steel bowl of a small epicyclic mixer to which 260 g. of sulphuric acid (diluted with water to a concentration of 95% acid) were added and the whole mixture agitated at the slowest speed of the mixer. During this period, the wheat kernels took on a darkened appearance due to the sulphuric acid darkening upon dissolving the bran and there was also a rise in temperature in the mass. After 30 minutes, the mix was washed four times with clean water under agitation following which the suspension in water was neutralized with 5 g. of calcium hydroxide. The resulting slurry, under agitation, was washed several times more during which time the remainder of the bran fragments were removed. The clean kernels were then dried in a warm air drier to a moisture content of 12%. Upon cooking, these kernels became soft in 20 minutes, had a desirable mouth feel and a good appearance.

EXAMPLE 3

Two kg. of wheat were placed in a stainless steel bowl of a small epicyclic mixer to which 260 g. of a mixture of concentrated sulphuric acid and concentrated ortho phosphoric acid (95% sulphuric acid, 5% phosphoric acid) were added and the whole mixture agitated at the slowest speed of the mixer. During this period, the kernels took on a darkened appearance due to the sulphuric acid darkening upon dissolving the bran and there was also a rise in temperature in the mass. After 25 minutes, the mix was washed four times with clean water under agitation following which the suspension in water was neutralized with 5 g. of calcium hydroxide. The resulting slurry was washed several times more under agitation during which time the remainder of the bran fragments were removed. The clean kernels were then dried in a warm air drier to a moisture content of 12%. Upon cooking, these kernels became soft in 20 minutes, had a desirable mouth feel and a good appearance.

EXAMPLE 4

Two kg. of wheat were placed in a stainless steel bowl of a small epicyclic mixer to which 250 g. of a mixture of concentrated sulphuric acid and concentrated hydrochloric acid (95% sulphuric acid, 5% hydrochloric acid) were added and the whole mixture agitated at the slowest speed of the mixer. During this period, the kernels took on a darkened appearance due to the sulphuric acid darkening upon dissolving the bran and there was also a rise in temperature in the mass. After 20 minutes, the mix was washed four times with clean water under agitation following which the suspension in water was neutralized with 5 g. of calcium hydroxide. The resulting slurry was washed several more times under agitation during which time the remainder of the bran fragments were removed. The clean kernels were then dried in a warm air drier to a moisture content of 12%. Upon cooking, these kernels became soft in 20 minutes, had a desirable mouth feel and a good appearance.

EXAMPLE 5

Two kg. of wheat were placed in a stainless steel bowl of a small epicyclic mixer to which 260 g. of a mixture of 80% concentrated sulphuric acid (S.G. 1.831) and 20% water were added and the whole mixture agitated at the slowest speed of the mixer. During this period, the kernels took on a darkened appearance due to the sulphuric acid darkening upon dissolving the bran and there was also a rise in temperature in the mass. After 30 minutes, the mix was washed four times with clean water under agitation following which the suspension in water was neutralized with 5 g. of sodium bicarbonate. The resulting slurry was washed several more times under agitation during which time the remainder of the bran fragments were removed. The clean kernels were then dried in a warm air drier to a moisture content of 12%. Upon cooking, these kernels became soft in 20 minutes, had a desirable mouth feel and a good appearance.

The clean, debranned kernels obtained from the above examples, had a good taste and were found to have acceptable shelf life characteristics. Furthermore, the wheat germ did not appear to be damaged and the oil and protein content of the treated wheat was found to be about the same as that of untreated wheat.

EXAMPLE 6

Seventy five g. of a sulphuric acid having an acid concentration of 80% weight was added to 500 g. of wheat. The proportion by weight of acid medium to wheat was 15%. The mixture was placed in glass containers and allowed to stand with only occasional stirring. After about 7 hours, about 80% by weight of the bran was removed. It was computed that the wheat loss was about 22% after the treated wheat was dried. The treated wheat did not become soft on cooking.

This example indicates that the efficiency of the process decreases as the concentration of the sulphuric acid decreases. It further illustrates that as the acid concentration decreases the need for mixing during the treatment period increases if the duration of treatment is to be reduced to a reasonable period.

Additional examples were conducted to illustrate the effect of varying the proportion by weight of acid medium to wheat. These examples were all conducted using as the acid medium, concentrated sulphuric acid having a specific gravity of 1.83.

EXAMPLES 7 AND 8

In both of these examples, 100 g. of concentrated sulphuric acid were added to 2 kg. of wheat and the mixture stirred continually for 55 minutes. The proportion by weight of acid medium to wheat was 5%.

In one instance (Example 7), it was found that after 30 minutes only about 5% of bran had been removed. In the other instance (Example 8), it was found that after 55 minutes about 35% of bran had been removed.

When samples from these examples were left standing over night and then washed, it was found that about 60% bran had been removed, but that there had been considerable damage to the starch bodies of the kernels. The wheat had a rough appearance and did not become soft on cooking.

These two examples indicate that the proportion by weight of acid medium to wheat was too low. If stirring had been continued for longer than 55 minutes, the percentage of bran removal would have been improved and damage to the starch bodies would have been reduced if treatment was terminated at the proper time. However, the period of treatment required would still have been excessive and the ratio of bran removal to wheat loss would have been uneconomical.

EXAMPLES 9, 10 AND 11.

In each of these three examples, 500 g. of concentrated sulphuric acid were added to 2 kg. of wheat resulting in a proportion of acid medium to wheat of about 25%.

In the first example (Example 9), treatment was allowed to continue for 6 minutes. This resulted in considerable charring and spoilage of almost all the wheat.

In the second example (Example 10), the treatement period was 3 minutes for one sample and 4 minutes for another sample. Where the treatment period was 3 minutes, only partial removal of bran was effected, but where the treatment period was 4 minutes, about 70% of the bran was removed.

In the third example (Example 11), the treatment period was 5 minutes and yielded excellent results. The bran was completely removed and there was no evidence of charring or black lines in the cleavage of the kernels. The kernels were completely soft on cooking.

From the foregoing examples, it can be seen that where a concentrated sulphuric acid is used with an acid medium to wheat proportion of about 25% by weight, treatment periods can be short and bran removal is extremely effective. When the proportion by weight of acid medium to wheat was reduced to about 13%–16%, it was found that, although the treatment periods required were slightly longer, bran removal was still effective and wheat loss remained below about 20% by weight.

EXAMPLE 12

In this example, 1 kg. of concentrated sulphuric acid was added to 2 kg. of wheat with continual stirring for each sample subjected to treatment. It was found that after 2 minutes of treatment of one sample, there was partial bran removal. After 3 minutes of treatment of another sample, about 70% of the bran had been removed. After 4 minutes of treatment of a third sample, there was 100% bran removal with indications of overtreatment. When the duration of treatment was 5 minutes for a fourth sample, there was considerable charring and the wheat was spoiled.

It will be appreciated, therefore, that not only do high proportions of acid medium to wheat require treatment periods that are too short for practical purposes, but such high dosages of acid medium are also uneconomical.

To illustrate the ineffectiveness and the difficulties encountered when low concentrations of sulphuric acid are used, the results of additional experiments conducted are set out below. Due to the corrosive action of hot, aqueous sulphuric acid, even on high grade stainless steel, it was necessary to use glass containers in these experiments.

EXPERIMENT 1

A sulphuric acid solution (14.8 g.) having a sulphuric acid concentration of 70% by weight, was added to 80 g. of wheat in a glass beaker. The proportion by weight of acid medium to wheat was computed to be about 14%. The sample was heated to 90° C. and stirred with a glass agitator for 14 minutes. Although the bran was largely removed, there resulted considerable charring with permanent black streaks along the cleavage of the wheat kernels and a high wheat loss. The grains were found to be reasonably soft after 20 minutes cooking.

EXPERIMENT 2

The same experiment as Experiment 1 was repeated at 60° C. In this instance, only partial removal of the bran was obtained and the grains were not quite soft after 20 minutes cooking. The wheat loss was again found to be high.

EXPERIMENT 3

The same procedures as in Experiments 1 and 2 above were repeated, again using a sulphuric acid solution having an acid concentration of 75% by weight. The treatment temperature was 60° C. and the treatment period was 20 minutes. Although a more complete removal of bran was effected than in Experiment 2, bran removal was not complete and the wheat loss was high. The kernels had black lines in the cleavage and cooking did not provide soft grains.

When the same experiments were conducted at room temperature it was found that extended treatment periods were required to provide a reasonable degree of debranning, but this led to substantial damage to the kernels.

Additional experiments were also conducted on a pilot plant scale to establish the parameters of the invention for commercial application. The pilot plant was capable of producing treated wheat in 100 kg. lots utilizing the following equipment.

1. A stainless steel reactor vessel equipped with a stainless steel stirrer which was centrally positioned and had blades covering substantially the entire diameter of the reactor vessel.
2. A pump positioned beneath the reactor vessel to transfer the reacted, treated wheat to a washing vessel. After reaction, the wheat was fluidized in the reactor vessel by the addition of water and was then immediately pumped to the washing vessel.
3. The washing vessel consisted of a cylindrical (±1 m diameter) plastic vessel eqipped with an agitator in the form of a four blade stainless steel agitator. The agitator was driven at rates varying between 150 and 400 r.p.m., preferably at about 300 r.p.m. The agitator blades were set to move the mixture around the container as well as to throw it upwards. Above the blades, the washing vessel was fitted with a stainless steel screen having 2 mm openings. This screen served to retain the wheat in the washing vessel during agitation. The washing vessel further had a liquid inlet at its bottom and a liquid outlet at its top.

In carrying out the pilot plant experiments, wheat and concentrated acid medium were introduced into the reactor vessel and the stirrer was driven at a rate of between about 40 and 100 r.p.m., conveniently at a rate about 60 r.p.m.

Following the required reaction period, the wheat/acid medium was fluidized by the addition of water to the reactor vessel, and the fluidized wheat was then immediately pumped to the washing vessel whereupon the stirrer was started while concurrently introducing copious amounts of water rapidly through the bottom inlet of the washing vessel. All of the remnants of bran adhering to the wheat were removed by attrition between the kernels and these remnants were removed with the fast current of water flowing through the fluidized mass and through the stainless steel screen. The washing cycle took no longer than about 5 minutes, after which the wheat, fluidized in water was removed for drying.

From the pilot plant experiments, it was found that using sulphuric acid having a concentration of 80% by weight, about a 50 minute treatment period was required to produce an acceptable degree of debranning. For commercial applications of the method of this invention, therefore, it appears that sulphuric acid having a concentration of substantially more than 80% should be used. This is consistant with the results obtained in the examples hereinabove.

The pilot plant experiments also showed that, for best results, the sulphuric acid should have a concentration of at least about 95% by weight and that the proportion by weight of acid to wheat should be at least about 13% by weight to produce a good product. However, if the degree of agitation is increased, then even if the proportion by weight of concentrated sulphuric acid to wheat is less than 13%, acceptable results could be obtained.

When sulphuric acid having a concentration by weight of at least 95% was used, it was found that the treatment period could be about 8 minutes with stirring in the reactor vessel. If desired, this treatment period can be increased by reducing the rate of stirring.

While it was found possible to use a treatment period of as low as about 6 minutes, treatment periods of about 7 to 9 minutes were found to be preferable in order to ensure that the debranned kernels became sufficiently softened within reasonable cooking times of about 20 minutes.

These pilot plant experiments reveal that the entire process can be conducted in less than 15 minutes to the point where the debranned wheat is ready for drying and that the debranned wheat would then require only about 20 minutes for soft cooking to obtain an acceptable product, both organoleptically and in appearance. It was further found that if the debranned wheat was slightly acid, a softer product was obtained upon cooking. If desired, therefore, neutralization of the washed, debranned kernels can be controlled to ensure that slight traces of acid residue remain on the debranned wheat kernels.

What is claimed is:

1. A method for debranning wheat consisting essentially of:
   mixing wheat with a mineral acid medium containing sulphuric acid which is present at a concentration of at least about 80% by weight, the ratio of said acid medium to said wheat being no greater than about 30% by weight;
   maintaining said wheat in contact with said acid medium for a period sufficient to recover therefrom debranned wheat having a wheat loss of no greater than about 40% by weight; and, washing said recovered wheat with a neutralizing medium to a pH of about 7.0.

2. The method of claim 1 wherein said wheat-acid medium mixture is mixed and agitated during said contact period.

3. The method of claim 1 wherein said wheat is dried to a moisture level of less than about 20% by weight before being treated.

4. The method of claim 1 wherein said acid medium includes minor amounts of an acid selected from the group consisting of hydrochloric acid, nitric acid, phosphoric acid and mixtures thereof.

5. The method of claim 1 wherein said recovered wheat is dried to a moisture level of about 10–12% by weight.

6. The method of claim 1 wherein said contact period is less than about 20 minutes.

7. The method of claim 1 wherein said neutralizing medium is water.

8. The method of claim 1 wherein said neutralizing medium is an aqueous alkaline solution wherein the alkali is a member selected from the group consisting of sodium hydroxide, sodium carbonate, sodium bicarbonate, calcium carbonate and calcium hydroxide.

9. The method of claim 1 wherein said wheat loss is about 25–30% by weight.

10. The method of claim 1 wherein said wheat loss is less than about 20% by weight.

11. The method of claim 10 wherein said wheat loss is less than about 15% by weight.

12. The method of claim 1 wherein said sulphuric acid concentration is at least about 90% by weight.

13. The method of claim 12 wherein said sulphuric acid concentration is at least about 95% by weight.

14. The method of claim 1 wherein said acid medium to wheat ratio is about 10–20% by weight.

15. The method of claim 14 wherein said acid medium to wheat ratio is about 13–16% by weight.

16. A method for debranning wheat consisting essentially of:
mixing wheat having a moisture level no greater than about 20% by weight with a mineral acid medium containing sulphuric acid which is present at a concentration of at least about 80% by weight, the ratio of said acid medium to said wheat being no greater than about 30% by weight;
maintaining said wheat in contact with said acid medium in said mixture for a period of less than about 20 minutes;
recovering from said mixture debranned wheat having a wheat loss no greater than about 40% by weight;
neutralizing said recovered wheat with an aqueous neutralizing solution to a pH of about 7.0; and,
drying said recovered wheat to a moisture level of about 10–12% by weight.

17. The method of claim 16 wherein the wheat-acid medium mixture is mixed and agitated during said contact period.

18. The method of claim 16 wherein said acid medium includes minor amounts of an acid selected from the group consisting of hydrochloric acid, nitric acid, phosphoric acid, and mixtures thereof.

19. The method of claim 16 wherein said neutralizing solution includes an alkali selected from the group consisting of sodium hydroxide, sodium carbonate, sodium bicarbonate, calcium carbonate and calcium hydroxide.

20. The method of claim 16 wherein said wheat loss is about 25–30% by weight.

21. The method of claim 16 wherein said wheat loss is less than about 20% by weight.

22. The method of claim 21 wherein said wheat loss is less than about 15% by weight.

23. The method of claim 16 wherein said sulphuric acid concentration is at least about 90% by weight.

24. The method of claim 23 wherein said sulphuric acid concentration is at least about 95% by weight.

25. The method of claim 16 wherein said acid medium to wheat ratio is about 10–20% by weight.

26. The method of claim 25 wherein said acid medium to wheat ratio is about 13–16% by weight.

27. A method for debranning wheat consisting essentially of:
mixing wheat having a moisture level no greater than about 20% by weight with a mineral acid medium containing sulphuric acid which is present at a concentration of at least about 90% by weight, the ratio of said acid medium to wheat being about 10–20% by weight;
maintaining said wheat in contact with said acid medium in said mixture for a period of less than about 20 minutes; mixing and agitating said mixture during said contact period;
recovering from said mixture debranned wheat having a wheat loss of about 25–30% by weight;
neutralizing said recovered wheat with an aqueous neutralizing solution to a pH of about 7.0; and,
drying said recovered wheat to a moisture level of about 10–12% by weight.

28. The method of claim 27 wherein said acid medium includes minor amounts of an acid selected from the group consisting of hydrochloric acid, nitric acid, phosphoric acid, and mixtures thereof.

29. The method of claim 27 wherein said neutralizing solution includes an alkali selected from the group consisting of sodium hydroxide, sodium carbonate, sodium bicarbonate, calcium carbonate, and calcium hydroxide.

30. The method of claim 27 wherein said wheat loss is less than about 20% by weight.

31. The method of claim 30 wherein said wheat loss is less than about 15% by weight.

32. The method of claim 27 wherein said sulphuric acid concentration is at least about 95% by weight.

33. The method of claim 27 wherein said acid medium to wheat ratio is about 13–16% by weight.

34. The method of claim 27 wherein said recovered wheat contains a slightly acid residue.

* * * * *

UNITED STATES PATENT AND TRADEMARK OFFICE
CERTIFICATE OF CORRECTION

PATENT NO. : 4,064,284
DATED : December 20, 1977
INVENTOR(S) : Pieter Paul Adriaan Theron, Adrianus Martinus Vissers and Aureliano Luigi Saisselin It is certified that error appears in the above-identified patent and that said Letters Patent are hereby corrected as shown below:

Column 5, line 66, after "Two", insert --(2)--.

Column 6, line 17, after "Two", insert --(2)--.

Column 6, line 38, after "Two", insert --(2)--.

Column 6, line 59, after "Two", insert --(2)--.

Column 7, line 12, after "Two", insert --(2)--.

Column 7, line 39, after "Seventy five", insert --(75)--; same line after "acid" (first occurance), insert --solution--.

Signed and Sealed this

Eighteenth Day of April 1978

[SEAL]

Attest:

RUTH C. MASON
Attesting Officer

LUTRELLE F. PARKER
Acting Commissioner of Patents and Trademarks